C. R. HARRYMAN.
PLOW.
APPLICATION FILED FEB. 23, 1910.
970,818.
Patented Sept. 20, 1910.
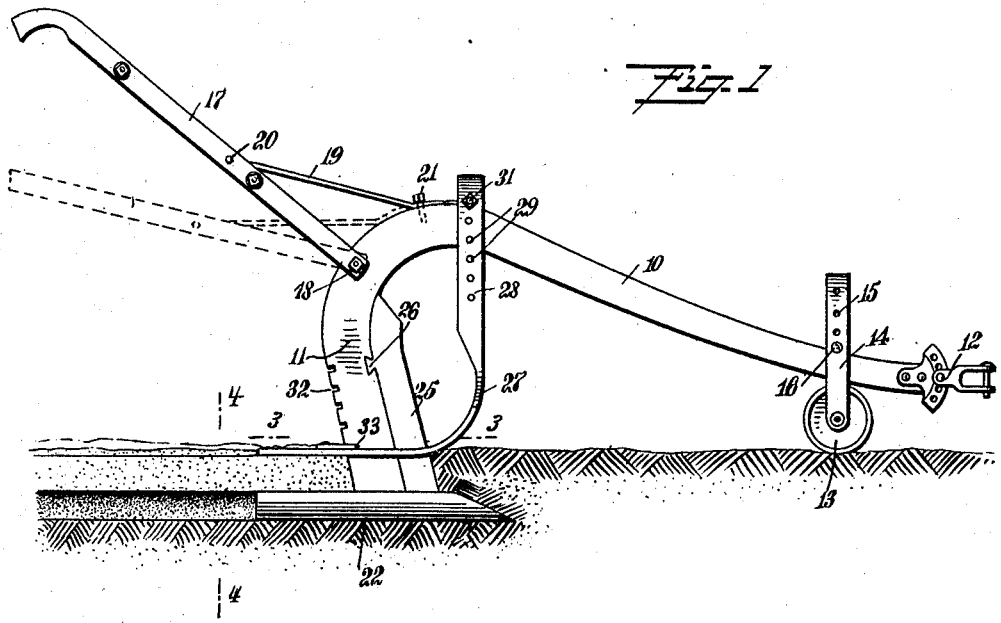
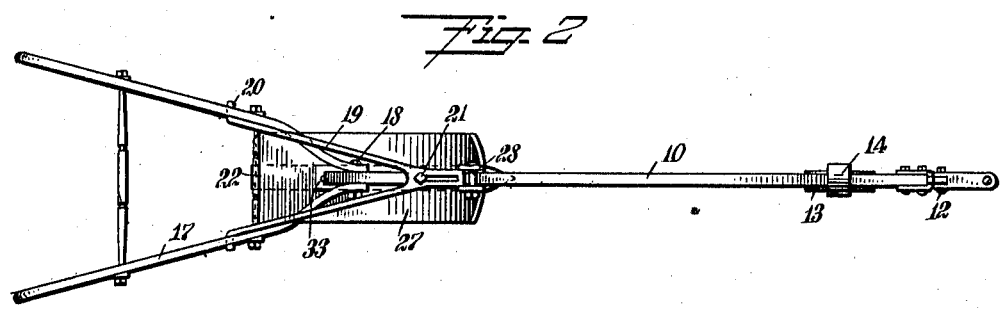
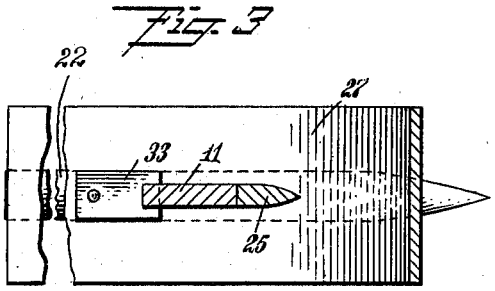
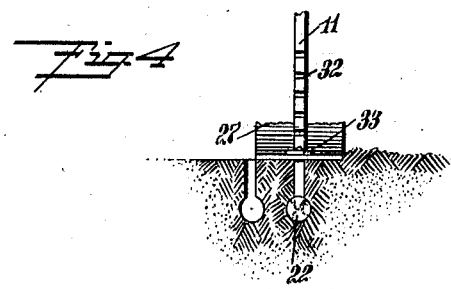
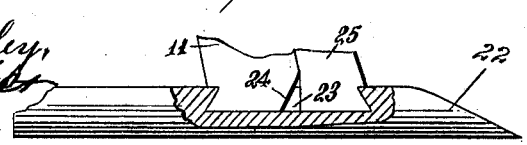
WITNESSES:
E. G. Bromley
INVENTOR
Carrel R. Harryman
BY
ATTORNEYS

UNITED STATES PATENT OFFICE.

CARREL R. HARRYMAN, OF SHAWNEE, OKLAHOMA.

PLOW.

970,818.

Specification of Letters Patent. Patented Sept. 20, 1910.

Application filed February 23, 1910. Serial No. 545,282.

*To all whom it may concern:*

Be it known that I, CARREL R. HARRYMAN, a citizen of the United States, and a resident of Shawnee, in the county of Pottawatomie and State of Oklahoma, have invented a new and Improved Plow, of which the following is a full, clear, and exact description.

The invention is an improvement in irrigating plows of the character disclosed in Letters Patent granted to Samuel L. F. Vose and Carrel R. Harryman, October 13, 1908, Number 901,220, the same having a subsoil share attached to the heel of the plow and provided with a shield, the share and plow beam in operation respectively cutting a conduit and a slot extending thereinto from the surface, and the shield limiting the depth to which the share passes below the surface, and smoothing over the soil at the top of the slot to prevent the loose dirt from dropping into the conduit.

The present invention has in view a plow of this character having a knife for cutting the slot, applied at the front of the plow beam, the knife and share being detachably connected to each other and to the beam, whereby they can be removed for grinding, renewal, etc.

The invention further resides in certain special features of construction and combination of parts, as will be hereinafter pointed out in the claims annexed.

Reference is to be had to the accompanying drawings forming a part of this specification, in which similar characters of reference indicate corresponding parts in all the views.

Figure 1 is a side view of a plow constructed in accordance with my invention, the plow being shown in operation; Fig. 2 is a plan of the plow; Fig. 3 is a cross-section of the same on the line 3—3 of Fig. 1; Fig. 4 is a section on the line 4—4 of Fig. 1; and Fig. 5 is a fragmentary sectional view showing the connection between the plowshare, knife and plow-beam.

The plow-beam 10 is of the usual construction except at the inner end 11, where it is relatively long and vertically arranged, the outer portion of the beam inclining downwardly and outwardly and provided at its forward end with any approved form of clevis 12, and at a point inwardly with a supporting wheel 13, the same being carried on a fork 14 which is made vertically adjustable by a number of apertures 15, through which the fastening bolt 16 is adapted to pass. Handle-bars 17 are pivoted to the beam at or near the top of the vertical portion on a bolt or other equivalent device 18, and are secured at various heights of pivotal adjustment by a brace 19, the latter having a fork, as shown in Fig. 2, with the ends offset as indicated at 20 and journaled in the handle-bars. The forward end of the brace is slotted and rests on top of the plow-beam, to which it is secured by a bolt 21.

A sub-soil plowshare 22 is provided with a groove or recess 23 in its upper face, confined to the intermediate portion thereof, with the ends of the groove undercut or dovetailed. The heel of the plow-beam is correspondingly formed to fit within the rear portion of the groove, and has the forward edge downwardly and rearwardly beveled as indicated at 24, the beveled portion being approximately parallel to the beveled or inclined portion at the rear edge. A knife 25 having a forward cutting edge is of substantially the same thickness as the plow-beam and extends along the forward edge of the vertical portion thereof, the heel of the knife being constructed to fit into the forward portion of the groove 23 of the plowshare, and having at its opposite and upper portion an undercut or dovetailed key 26, fitting within a corresponding groove extending crosswise of the plow-beam. A shield 27, has a flattened horizontal portion provided with an opening through which the vertical portion of the plow-beam and the knife extend, as shown in Fig. 3, and curves upwardly at the front, where it is provided with a fork 28, having a number of apertures 29. Through any set of these apertures is adapted to pass a bolt or pin 31. The vertical portion of the plow-beam at its rear edge is provided with a number of teeth or recesses 32, with which is adapted to engage a plate or tooth 33, pivoted to swing from one side of the plow to the other on the shield 27. Thus, by reason of this construction and the several sets of apertures in the forked or forward portion of the shield, the latter may be vertically adjusted and secured in any position within certain limits and adapt the plowshare to pass below the surface of the soil to different depths.

To remove the knife and plowshare for grinding, renewal or other purposes, the latch or plate 33 is swung outwardly to disengage the plow-beam, and the bolt 31 removed from the fork of the shield, allowing the shield to drop to its lowest position. The upper portion of the knife is then sprung to one side to release the key 26 from the plow-beam, at which time the knife is drawn forwardly until the rear edge of the heel bears and extends along the beveled forward edge 24 of the heel of the plow-beam, at which time the knife may be withdrawn from the plowshare and the plowshare itself released from the beam. In applying the plowshare and the knife the operation is reversed. With the plowshare, knife and shield assembled with the beam, the shield holds the knife against lateral movement relatively to the beam and thus prevents the knife from being accidentally detached.

Having thus described my invention, I claim as new and desire to secure by Letters Patent:

1. The combination of a plow-beam, a sub-soil share removably attached to the beam, and a knife extending upwardly from the share and detachably connected thereto and to the beam.

2. The combination of a plow-beam, a plowshare having an undercut groove in the upper side thereof receiving the heel of the beam, and a knife having a heel adapted to fit within the forward portion of the groove and extend upwardly at the front of the beam, with the said knife and beam constructed to permit of the withdrawal of the knife from the recess of the share when the upper portion of the knife is moved forwardly from the beam.

3. The combination of a plow share having a groove undercut at the ends, a plow-beam, and a knife having heels fitting within the groove, one of which has a beveled edge to permit of the removal of the other from the recess when the upper portions of the beam and knife are moved apart.

4. The combination of a plowshare having a groove provided with undercut ends, a plow-beam, and a knife having heels removably fitting within the groove of the share and provided with interfitting portions near the upper portion of the knife constructed to be released by a relatively lateral movement.

5. The combination of a plow-beam, a sub-soil plowshare removably secured to the heel of the beam, and a knife adapted to extend from the share along the forward edge of the beam and having a heel movable into and out of engagement with the share in a downwardly and rearwardly inclined position, and having means near the upper portion thereof movable into and out of locking engagement with the beam by a relatively lateral movement.

6. The combination of a plow-beam having an upwardly extending inner portion provided with recesses at the rear edge thereof, a sub-soil share secured to the heel of the beam, and a shield vertically adjustable on the inner portion of the share and having means for engaging in said recess and locking it in different positions of adjustment.

7. The combination of a plow-beam having an upwardly-extending inner portion provided with teeth, a sub-soil plowshare secured to the heel of the inner portion of the beam, and a shield vertically adjustable on the upwardly-extending portion of the share and having a movable member adapted to engage with one of said teeth and lock the shield in various positions of adjustment.

8. The combination of a plow-beam, handle-bars pivoted at their inner ends to the beam, a brace having a forked rear portion provided with offset ends journaled in the handle-bars and having a slotted forward portion extending along the beam, and a bolt passing through the slot of the said forward portion and adjustably securing it to the beam.

9. The combination of a plow-beam, a sub-soil plowshare removably attached to the heel of the beam, a knife extending upwardly from the share at the front of the beam, and a shield engaging the knife and beam at opposite sides and holding them against relative lateral movement.

In testimony whereof I have signed my name to this specification in the presence of two subscribing witnesses.

CARREL R. HARRYMAN.

Witnesses:
CHAS. E. WELLS,
E. E. WHITTAKER.